US006768244B2

(12) United States Patent
Ong et al.

(10) Patent No.: US 6,768,244 B2
(45) Date of Patent: Jul. 27, 2004

(54) STATOR, DYNAMOELECTRIC MACHINE, AND METHODS FOR FABRICATING SAME

(75) Inventors: Raymond K.J. Ong, Peterborough (CA); John Young, Omemee (CA); Gerald Burt Kliman, Niskayuna, NY (US); Lembit Salasoo, Niskayuna, NY (US)

(73) Assignee: General Electric Canada Inc., Mississauga (CA)

( * ) Notice: Subject to any disclaimer, the term of this patent is extended or adjusted under 35 U.S.C. 154(b) by 0 days.

(21) Appl. No.: 09/681,253

(22) Filed: Mar. 8, 2001

(65) Prior Publication Data

US 2001/0035692 A1 Nov. 1, 2001

Related U.S. Application Data

(60) Provisional application No. 60/199,424, filed on Apr. 25, 2000.

(51) Int. Cl.$^7$ .................................................. H02K 1/12
(52) U.S. Cl. .......................................... 310/254; 29/596
(58) Field of Search ................................ 310/254, 179, 310/216; 29/596; 505/166

(56) References Cited

U.S. PATENT DOCUMENTS

| | | | | |
|---|---|---|---|---|
| 4,087,708 A | | 5/1978 | Laing | 310/64 |
| 4,179,635 A | | 12/1979 | Beermann | 310/214 |
| 4,278,905 A | | 7/1981 | Chari et al. | 310/254 |
| 4,330,726 A | | 5/1982 | Albright et al. | 310/52 |
| 4,352,034 A | * | 9/1982 | Karhan et al. | 310/55 |
| 4,356,419 A | | 10/1982 | Böer et al. | 310/217 |
| 4,375,043 A | * | 2/1983 | Roger | 310/214 |
| 4,380,713 A | * | 4/1983 | Roger et al. | 29/596 |
| 4,663,551 A | * | 5/1987 | Weh et al. | 310/12 |
| 4,695,419 A | | 9/1987 | Inariba | 264/259 |
| 4,709,180 A | * | 11/1987 | Denk | 310/179 |
| 4,755,698 A | | 7/1988 | Frister et al. | 310/51 |
| 5,013,953 A | * | 5/1991 | Odell | 310/179 |
| 5,053,663 A | | 10/1991 | Böer et al. | 310/91 |
| 5,177,054 A | * | 1/1993 | Lloyd et al. | 310/10 |
| 5,179,304 A | | 1/1993 | Kenjo et al. | 310/12 |
| 5,355,743 A | * | 10/1994 | Tesar | 475/149 |
| 5,482,919 A | * | 1/1996 | Joshi | 310/52 |
| 5,483,111 A | * | 1/1996 | Kuznetsov | 104/292 |
| 5,670,838 A | * | 9/1997 | Everton | 310/254 |
| 5,744,032 A | * | 4/1998 | Kemper | 210/238 |
| 6,037,692 A | * | 3/2000 | Miekka et al. | 310/181 |
| 6,313,556 B1 | * | 11/2001 | Dombrovski et al. | 29/596 |

FOREIGN PATENT DOCUMENTS

| | | | | |
|---|---|---|---|---|
| FR | 2536922 A1 | * | 6/1984 | H03K/19/23 |
| JP | 61109435 A | * | 5/1986 | H02K/1/06 |
| JP | 06141531 A | * | 5/1994 | H02K/55/00 |
| WO | WO 8202628 A1 | * | 8/1982 | |

OTHER PUBLICATIONS

*Advances In Cryogenic Engineering*, vol. 27, New York, Cryogenic Engineering Conference; distributed by Plenum Press, 1960.

* cited by examiner

*Primary Examiner*—Joseph Waks
(74) *Attorney, Agent, or Firm*—Karl A. Vick, Esq.; Armstrong Teasdale LLP

(57) ABSTRACT

A dynamoelectric machine includes a stator having teeth fabricated from a non-magnetic material and containing at least one embedded conductor. The teeth are unitary with a back portion that is mounted to a stator back iron. Permeance variations induced by a stator winding mounted on the non-magnetic stator teeth are low which facilitates a reduction of motor noise. Specifically, since the non-magnetic teeth reduce production of permeance variations, changes in air gap forces between the rotor and the stator are decreased.

20 Claims, 5 Drawing Sheets

US 6,768,244 B2

STATOR, DYNAMOELECTRIC MACHINE, AND METHODS FOR FABRICATING SAME

CROSS REFERENCE TO RELATED APPLICATIONS

This application claims the benefit of U.S. Provisional Application No. 60/199,424, filed Apr. 25, 2000.

BACKGROUND OF INVENTION

This invention relates generally to synchronous machines and, more particularly, to synchronous machines with High Temperature Superconducting rotors.

A synchronous machine typically includes a motor housing, a stator including a plurality of armature windings mounted between a plurality of stator teeth, and a rotor assembly. The rotor assembly includes a rotor core and a rotor shaft extending through the rotor core. The rotor core can be either a salient pole or a cylindrical configuration, and includes a plurality of field windings mounted thereon. The motor housing includes at least one endshield and houses at least a portion of the rotor assembly. Synchronous machines also typically include at least one bearing sized to receive and support the rotor shaft, and at least one inner bearing cap separated from the bearing. Typically, the bearing is positioned between an endshield and an inner bearing cap and facilitates rotation of the rotor shaft when the armature windings are energized.

Recent technological advances have allowed synchronous machines to utilize HTS (high temperature superconducting) ceramic field windings in lieu of conventional copper windings. The HTS windings typically are fabricated from bismuth-2223 ((Bi,Pb)2Sr2Ca2Cu3O10) and are loaded with significantly larger currents than conventional copper windings can sustain. Therefore, machines with HTS windings can generate more powerful magnetic fields in a given volume of space compared to machines with conventional windings. Currently, a cryogenically cooled superconducting machine utilizing a toothless stator winding is able to match the power output of an equally rated conventional machine with as little as one-third the size and weight of the conventional machine.

In a known machine with HTS windings, there are permeance variations in the stator due to the use of conventional slotted magnetic metal cores that generate varying forces in the air gap. The varying air gap forces can produce noise by exciting the machine's structure and the torque is limited by the need to provide space for the teeth structure. However, there are many applications where motor noise is undesirable and small size is important, such as, for example, in a submarine.

Accordingly, it would be desirable to facilitate a reduction in permeance variations and increase torque (power) density in a stator of a synchronous machine with HTS field windings.

SUMMARY OF INVENTION

The present invention is, in one aspect, a machine in which a stator is fabricated such that the teeth of the stator are of a non-magnetic material. Since the teeth are non-magnetic, the teeth do not contribute to generation of noise due to variations in magnetic fields, as do the magnetic teeth in known stators. Specifically, the non-magnetic teeth facilitate a reduction of permeance variations induced by a plurality of stator windings mounted on the stator teeth, thereby lessening variations in the air gap forces between a rotor and the stator. Additionally, utilizing non-magnetic teeth allows for the use of additional windings embedded in the non-magnetic teeth to increase current density and torque. Accordingly, noise caused by the variations in air gap forces is reduced and torque is increased.

DETAILED DESCRIPTION

Figure 1:
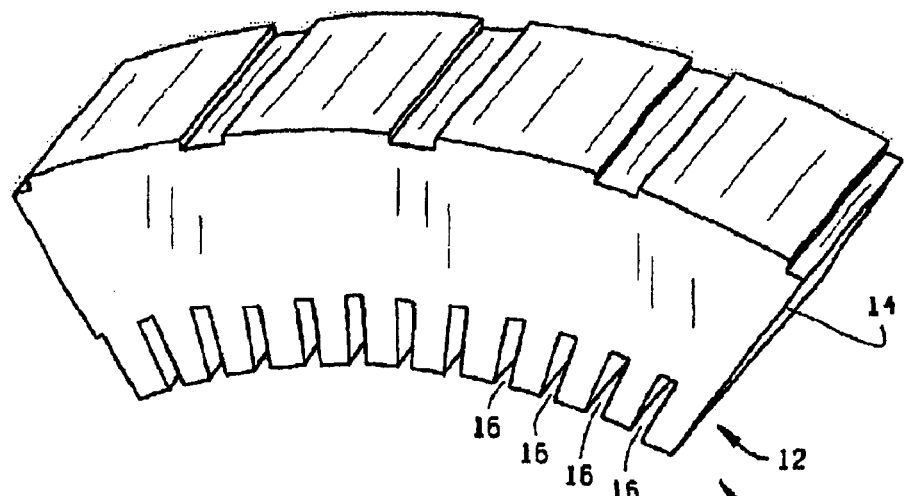
FIG. 1 is a perspective view of a portion of a known magnetic metal stator.

FIG. 1 is a perspective view of a portion of a known magnetic metal stator 10 including a plurality of teeth 12 and a yoke or back iron 14. A plurality of armature windings (not shown) are placed in a plurality of slots 16 defined by teeth 12. Teeth 12 are metal and are fabricated on a plurality of laminations that are stacked together to form stator section 10. Teeth 12 are unitary with back iron 14.

Figure 2:
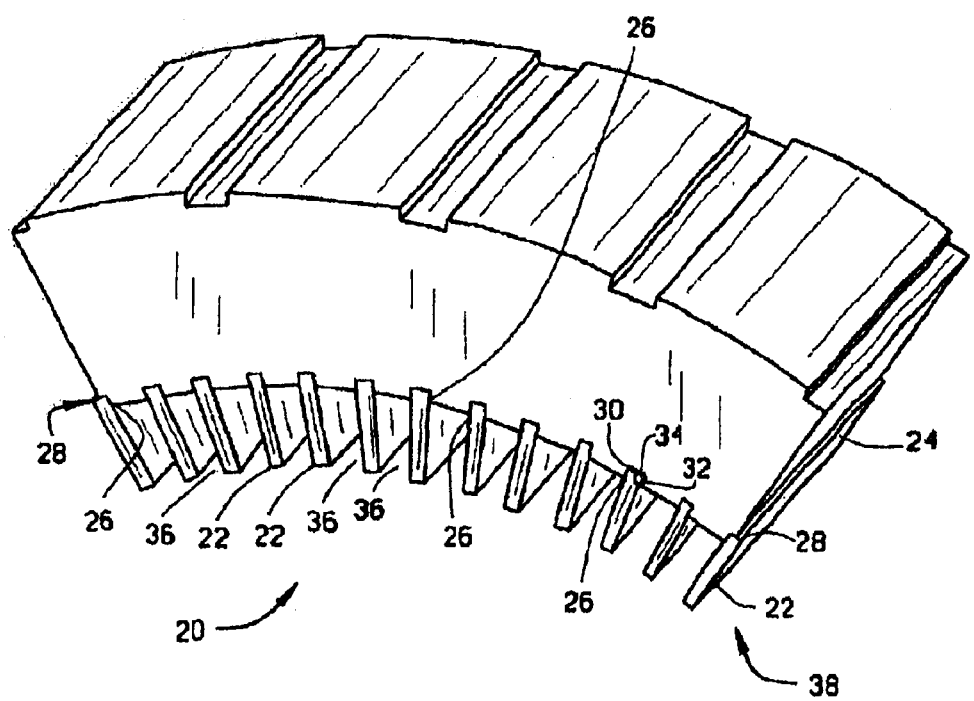
FIG. 2 is a perspective view of one embodiment of a stator magnetic metal yoke with non-magnetic teeth.

FIG. 2 is a perspective view of one embodiment of a stator 20 including a plurality of non-magnetic teeth 22 and a stator magnetic back iron 24 including a plurality of tooth slots 26. In an exemplary embodiment, non-magnetic teeth 22 are fabricated from a glass laminate. In an alternative exemplary embodiment non-magnetic teeth 22 are fabricated from a non-magnetic fiber, such as, for example, a carbon fiber. It is contemplated that the benefits of reduced permeance variations in an air gap accrue to all stators having a plurality of non-magnetic teeth fabricated from any non-magnetic material. Non-magnetic teeth 22 are connected individually to back iron 24 by inserting a back section 28 of each tooth 22 into a respective tooth slot 26. In an exemplary embodiment, each back section 28 includes a semi-cylindrical groove 30, and back iron 24 includes at least one semi-cylindrical groove 32 positioned such that fully seating a particular tooth 22 into a respective tooth slot 26 aligns semi-circular groove 30 with semi-circular groove 32 to form a substantially cylindrical opening 34 such that insertion of a rod (not shown) into opening 34 keys each tooth 22 to a respective tooth slot 26. In an alternative embodiment, each back section 28 includes a slot (not shown), and back iron 24 includes at least one slot (not shown) positioned such that fully seating a particular tooth 22 into a respective tooth slot 26 aligns the back iron slot with the tooth slot such that insertion of a rectangular piece of material keys each tooth 22 to a respective tooth slot 26. It is contemplated that the benefits of non-magnetic stator teeth accrue to all stators having non-magnetic teeth keyed thereon using any method of keying, such as, for example, dovetail keying and spline keying. In an alternative embodiment, each back section 28 is attached to a respective tooth slot 26 utilizing conventional adhesives. In a further alternative embodiment, each back section 28 is keyed and adhesively bonded to each respective tooth slot 26. Teeth 22 are spaced to define a plurality of slots 36 that can accommodate a plurality of armature windings (not shown). Since teeth 22 are non-magnetic, utilizing stator 20 in a machine with a HTS rotor results in a low noise signature due to the reduced permeance variations that non-magnetic teeth 22 provide in comparison to a machine utilizing stator 10. However, only half of an inner periphery 38 of stator 20 is used for torque production.

Figure 3:
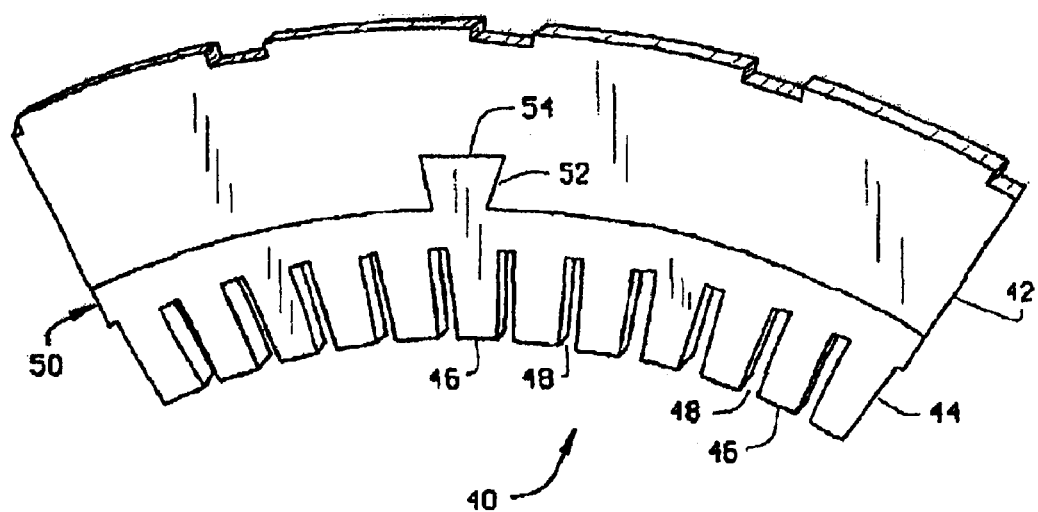
FIG. 3 is a perspective view of an alternative embodiment of a stator magnetic metal yoke with non-magnetic teeth.

FIG. 3 is a perspective view of an alternative embodiment of a stator 40 including a back iron 42 and a non-magnetic tooth section 44 including a plurality of teeth 46 defining a plurality of slots 48 that can accommodate a plurality of armature windings (not shown). Teeth 46 are fabricated unitarily with a back portion 50 of tooth section 44. Back portion 50 is substantially circular and includes at least one key 52 extending therefrom to key back portion 50 to back iron 42 utilizing a key receiving portion 54 of back iron 42.

In an exemplary embodiment, back portion 50 is keyed and adhesively bonded to back iron 42. In an alternative embodiment, back portion 50 includes a plurality of keys extending therefrom. In a further alternative embodiment, back iron 42 includes at least one key (not shown) and back portion 50 includes at least one key receiver portion (not shown). Since teeth 46 are non-magnetic, utilizing stator 40 in a machine with a HTS rotor results in a low noise signature due to the reduced permeance variations that non-magnetic teeth 46 provide in comparison to a machine utilizing stator 10 (shown in FIG. 1).

Figure 4:
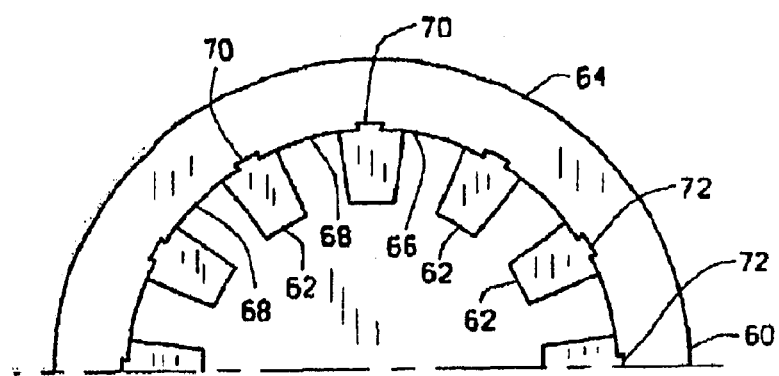
FIG. 4 is a cross-sectional view of an alternative embodiment of a stator having non-magnetic teeth.

FIG. 4 is a cross-sectional view of an alternative embodiment of a stator 60 including a plurality of non-magnetic teeth 62. Stator 60 has a substantially circular outer surface 64 and an inner surface 66 including a plurality of arcuate sections 68 interspersed with a plurality of key receiving sections 70. Each tooth 62 includes a retaining key 72 extending radially outward. In one embodiment, teeth 62 are molded with unitary keys 72 and are inserted in a machine along an axial direction by sliding each key 72 into a respective key receiving section 70. In an alternative embodiment, teeth 62 and keys 72 are machined utilizing conventional machine tools. Since teeth 62 are non-magnetic, utilizing stator 60 in a machine with a HTS rotor results in a low noise signature due to the reduced permeance variations that non-magnetic teeth 62 provide in comparison to a machine utilizing stator 10 (shown in FIG. 1).

Figure 5:
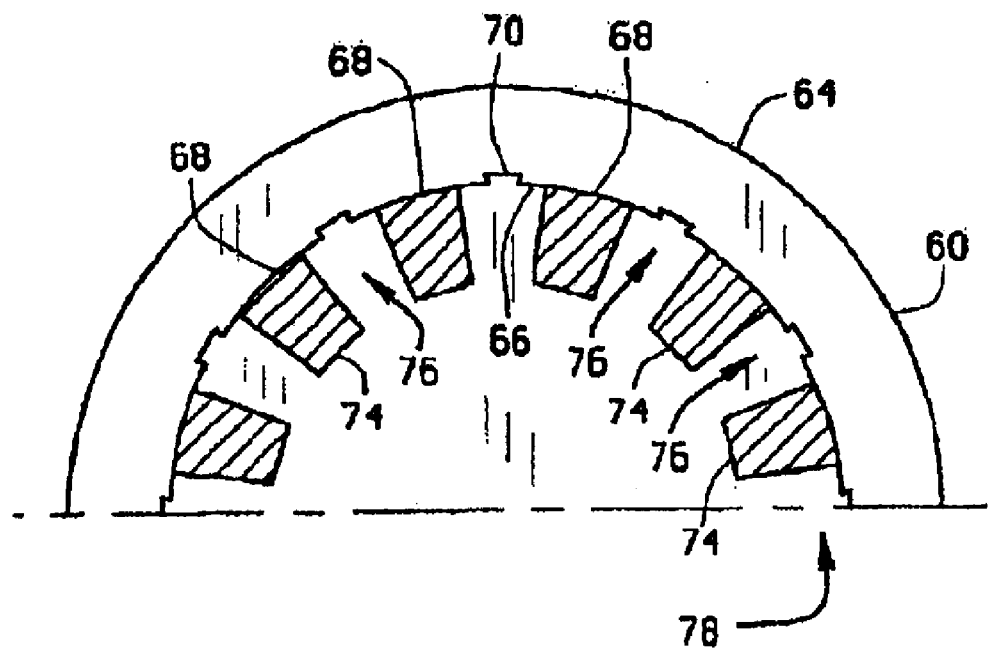
FIG. 5 is a cross-sectional view of the stator shown in FIG. 4 during fabrication.

FIG. 5 is a cross-sectional view of stator 60 (shown in FIG. 4) during fabrication according to one embodiment. A plurality of spacers 74 are removably mounted to inner surface 66 at each arcuate section 68 forming a plurality of radially extending cavities 76. Each cavity 76 is filled with filling material and a resin that is cured to produce rigid non-magnetic teeth 62 as shown in FIG. 4. Key receiving sections 70 are filled with the tooth material thereby forming and installing retaining key 72 unitary with teeth 62 in receiver sections 70 in a single operation.

In an exemplary embodiment, teeth 62 include a plurality of embedded conductors forming a plurality of first armature windings. Additionally, a plurality of second armature windings are wound around teeth 62 allowing for an increased effective current density and, hence, increased torque over stators without embedded windings as explained in more detail below. Each cavity 76 is wound with conductors to form a first set of armature windings. In an exemplary embodiment, other filler material, such as, for example, but not limited to, glass fibers and polymers are added to cavities 76 either before or after forming the first windings. The filler material is selected to affect the strength, rigidity, and/or thermal conduction properties of teeth 62. After the windings and the filler material are positioned in cavities 76 a resin is added and allowed to cure forming non-magnetic teeth 62 containing a first set of armature windings (not shown in FIG. 5). After the resin has cured, spacers 74 are removed, and teeth 62 are wound with a second set of armature windings (not shown in FIG. 5). Accordingly, in one embodiment, all of an inner periphery 78 of stator 60 is used to produce torque. The number of windings is increased in a stator including a first set of windings embedded in a plurality of non-magnetic teeth and a second set of windings are wound around the non-magnetic teeth resulting in a higher mean winding current density and higher torque. Although retaining key 72 is shown in the context of a dovetail key, it is contemplated that any method of keying can be utilized to obtain the benefits of winding embedded non-magnetic teeth.

Figure 6:
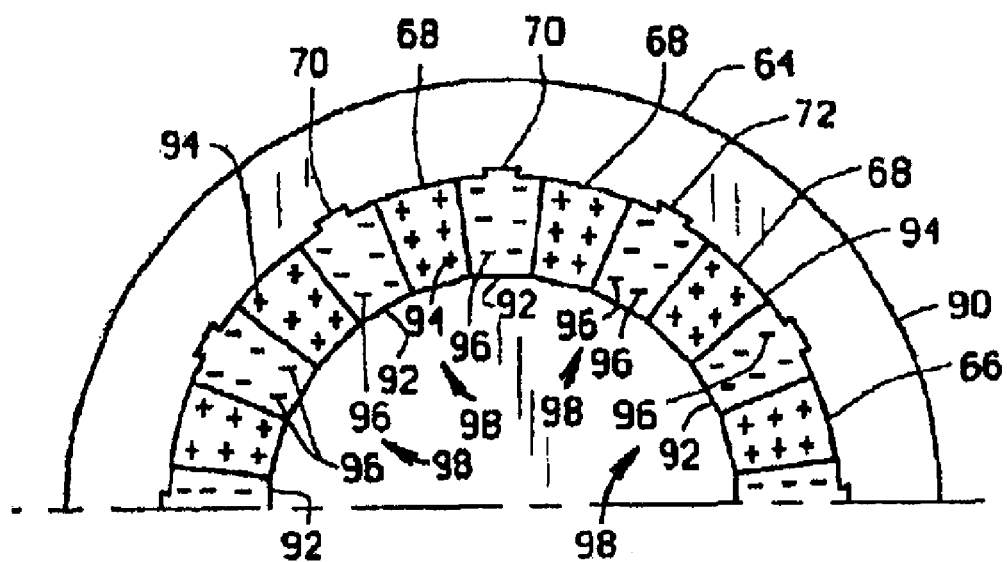
FIG. 6 is a cross-sectional view of a stator having a plurality of winding embedded non-magnetic teeth.

FIG. 6 is a cross-sectional view of a stator 90 including a plurality of winding embedded non-magnetic teeth 92 and a plurality of second windings 94 wound around non-magnetic teeth 92. Stator 90 is substantially similar to stator 60 shown in FIGS. 4 and 5, and components that are identical to components in stator 60 are identified in FIG. 6 using the same reference numerals used in FIGS. 4 and 5. Stator 90 has a substantially circular outer surface 64 and an inner surface 66 including a plurality of arcuate sections 68 interspersed with a plurality of key receiving sections 70. Each tooth 92 includes a key 72 extending radially outward and a plurality of conductors 96 forming a plurality of first windings 98. After teeth 92 are fabricated as explained above with resin and filler, removable spacers 74 are removed, second windings 94 are wound around teeth 92, and stator 90 is utilized in a machine to provide a higher current density than a machine without winding embedded non-magnetic teeth.

The higher current density allows for a machine with more torque than a machine without winding embedded teeth. Alternatively, the higher winding current density allows for a machine of significantly less size than a machine without winding embedded teeth. It is contemplated that the benefits of winding embedded non-magnetic teeth accrue to all types of electric machines including, for example, but not limited to, all synchronous machines, all non-synchronous machines, and direct current (DC) machines having stator windings. Additionally, the benefits accrue to inside-out or doubly-wound machines, i.e., machines with a stator at least partially mounted within a rotor bore.

Figure 7:
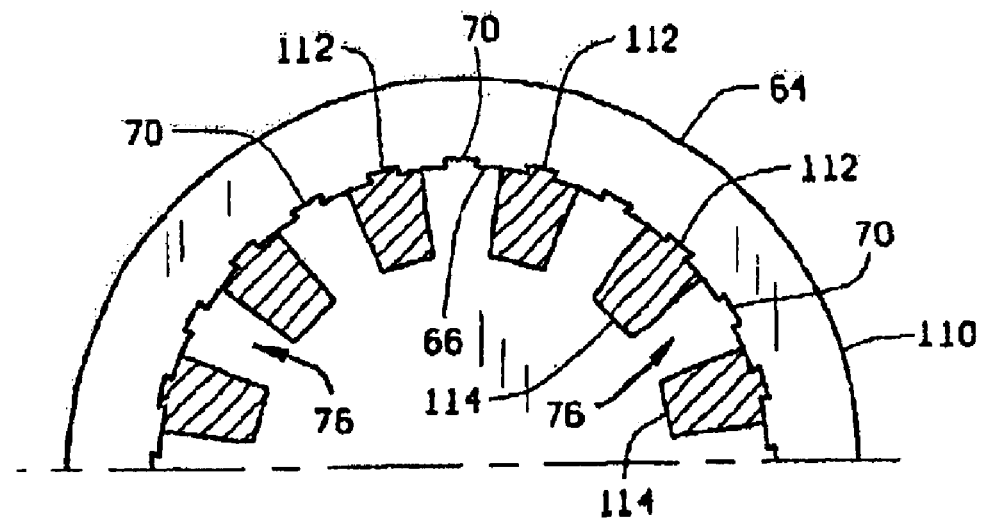
FIG. 7 is a cross-sectional view of a stator during fabrication.

FIG. 7 is cross-sectional view of a stator 110 during fabrication, stator 110 is substantially similar to stator 60 shown in FIGS. 4 and 5, and components that are identical to components in stator 60 are identified in FIG. 7 using the same reference numerals used in FIGS. 4 and 5. Stator 110 includes a substantially circular outer surface 64 and an inner surface 66 including a plurality of key receiving sections 70 interspersed with a plurality of second key retaining sections 112. A plurality of spacers 114 are removably mounted to inner surface 66 at each second key retaining section 112 forming a plurality of radially extending cavities 76. In an exemplary embodiment, spacers 114 are keyed to inner surface 66. Each cavity 76 is filled with a resin and cured to produce non-magnetic teeth, such as non-magnetic teeth 62 as shown in FIG. 4 or conductor embedded non-magnetic teeth 92 as shown in FIG. 6. Spacers 114 may be driven out axially to remove spacers 114 from inner surface 66. In an alternative embodiment, spacers 114 are fabricated from a frangible material and are destroyed thereby removing spacers 114 from inner surface 66. Key receiving sections 70 are filled with the tooth material thereby forming and installing retaining key 72 unitary with teeth 62 in receiver sections 70 in a single operation.

Figure 8:
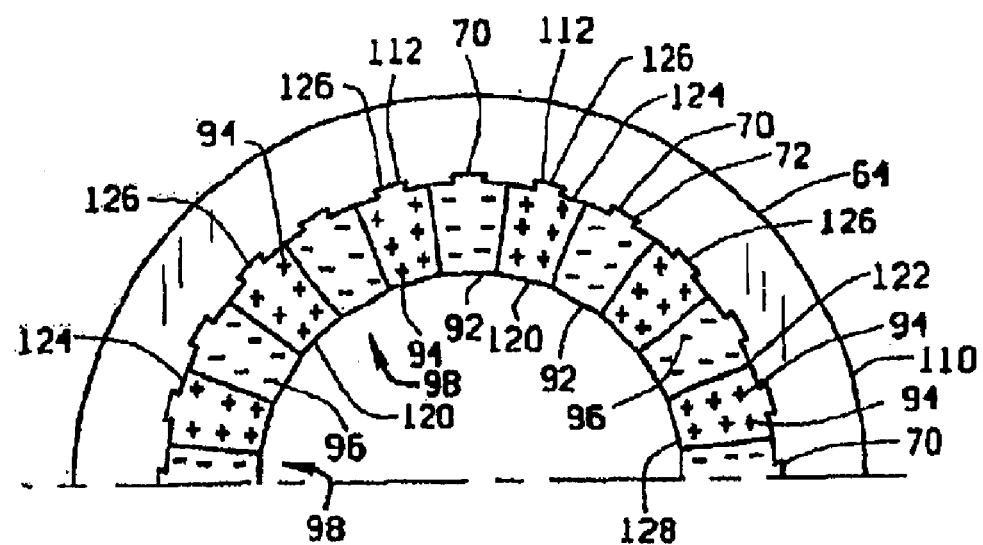
FIG. 8 is a cross-sectional view of the stator shown in FIG. 7.

FIG. 8 is a cross-sectional view of stator 110 (shown in FIG. 7) after fabrication. Stator 110 includes a plurality of first winding embedded non-magnetic teeth 92 interspersed with a plurality of second winding embedded non-magnetic teeth 120. Stator 110 has a substantially circular outer surface 64 and an inner surface 122 including a plurality of second winding key receiver sections 112 interspersed with a plurality of key receiving sections 70. Each first winding embedded non-magnetic tooth 92 includes a key 72 extending radially outward and a plurality of conductors 96 forming a plurality of first windings 98. After teeth 92 are fabricated, as explained above with resin and/or filler, removable spacers 114 are removed, second windings 94 are wound around teeth 92, and additional resin and filler is used to fabricate second winding non-magnetic teeth 120 as explained above regarding the fabrication of first winding non-magnetic teeth 92. Because inner surface 122 includes second winding key receiver sections 112, fabricating second winding non-magnetic teeth 120, forms and installs a plurality of second winding retaining keys 126 unitary with teeth 120 in a single operation. Accordingly, a substantially continuous inner tooth surface 128 is provided. Because second windings 94 are embedded in second non-magnetic teeth 120 that are keyed to stator 110, second winding retaining keys 126 support at least a portion of the torque produced by second windings 94 and, hence, first winding non-magnetic teeth 92 do not fully support the torque produced by second windings 94 providing for a structurally sound and longer lasting winding support system, while also providing the benefits of a higher current density and lower noise.

Figure 9:
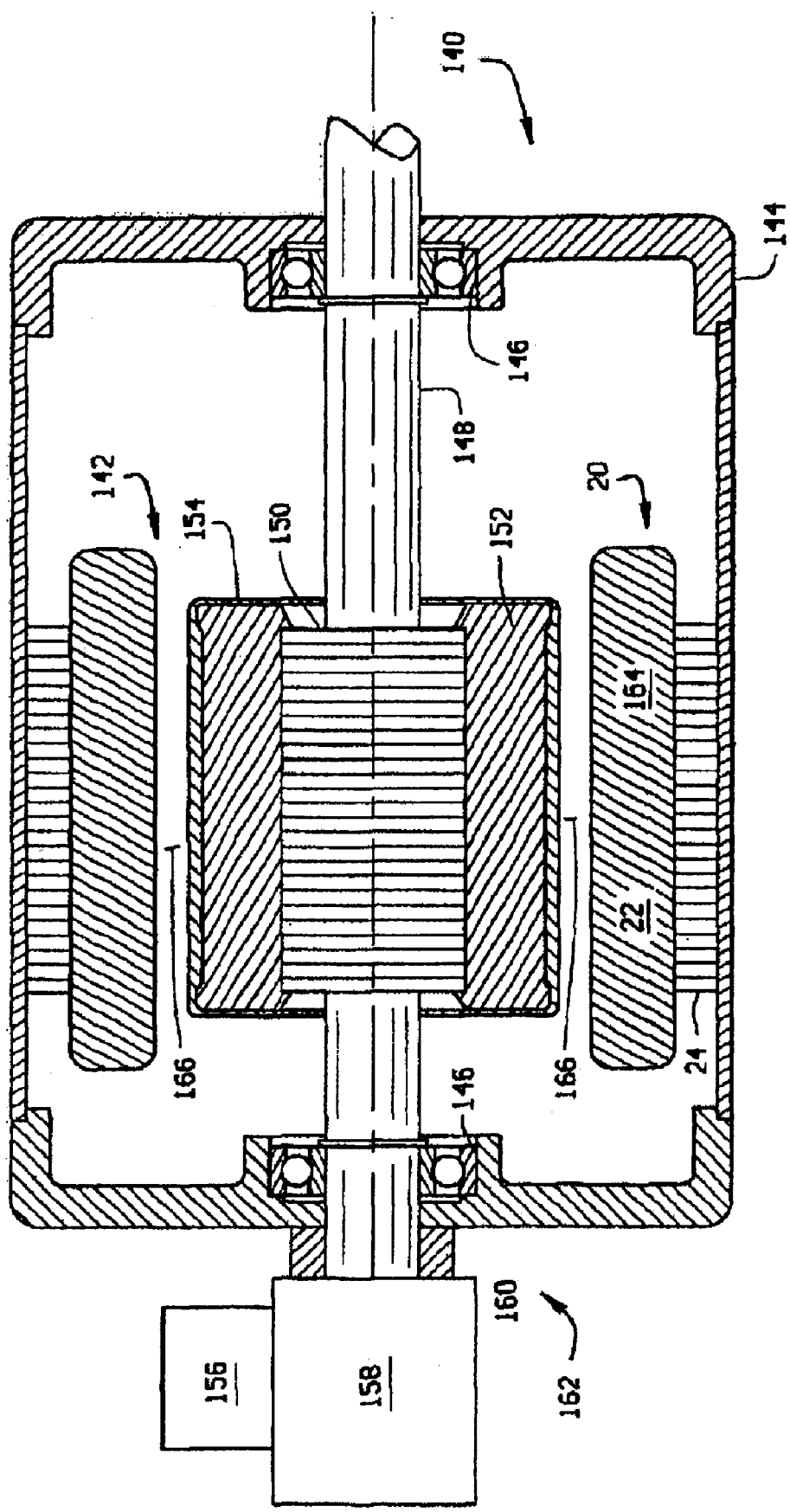
FIG. 9 is a cross sectional view of a synchronous machine including the stator shown in FIG. 2.

FIG. 9 is a cross sectional view of a synchronous machine 140 including stator 20 (shown in FIG. 2) including a bore 142 therethrough and back iron 24. Machine 140 further includes a housing 144 supporting a plurality of bearings 146. A rotor shaft 148 is rotatably positioned within bearings 146 and extends through bore 142. A field windings support member 150 is mounted on shaft 148 and supports a plurality of HTS windings 152. A rotor jacket 154 surrounds windings 152. Rotor jacket 154 is in flow communication with a vacuum pump 156 that maintains a pressure inside jacket 154 substantially lower than atmospheric pressure. A cryogenic cooler 158 and an exciter 160 are coupled to a first end 162 of shaft 148. Back iron 24 is mounted to housing 144. A plurality of armature windings 164 are mounted between non-magnetic teeth 22 that are separated from windings 152 by an air gap 166.

During operation of machine 140, cryogenic cooler 158 provides sufficient cooling to windings 152 allowing windings 152 to conduct as superconductors when energized. Superconducting windings 152 produce strong magnetic fields in gap 166. The fields extend into armature windings 164 and teeth 22, and are strongest in gap 166. However, since teeth 22 are non-magnetic, permeance variations are reduced over a machine with stator 10. Since permeance variations can cause noise, reducing permeance variations reduces noise. Although, an exemplary embodiment is described in the context of a synchronous machine, it is contemplated that the benefits of the invention accrue to a wide variety of rotary and linear electrical machines including, for example, but not limited to, reluctance machines, squirrel cage machines, direct current machines, and permanent magnet machines.

Utilizing a stator with non-magnetic teeth in a machine with a HTS rotor results in a low noise signature due to the reduced permeance variations that the non-magnetic teeth provide in comparison to a machine with magnetic teeth. In an exemplary embodiment, non-magnetic teeth 22 are winding embedded non-magnetic teeth resulting in a quiet and more powerful machine than an approximately equal sized machine without a stator including winding embedded non-magnetic teeth. Accordingly, an efficient and low noise machine is provided.

While the invention has been described in terms of various specific embodiments, those skilled in the art will recognize that the invention can be practiced with modification within the spirit and scope of the claims.

What is claimed is:

1. A method for facilitating a fabrication of a high temperature superconducting electrical machine, said method comprising the steps of:
   fabricating a back iron;
   attaching a plurality of non-magnetic teeth to the back iron wherein at least one non-magnetic tooth includes at least one embedded conductor; and
   installing the back iron in the machine.

2. A method for fabricating a stator with non-magnetic teeth, the stator including a non-magnetic tooth back portion including a plurality of non-magnetic teeth and a back portion, the non-magnetic teeth unitary with each other and with the back portion, said method comprises the steps of:
   fabricating a back iron; and
   attaching the non-magnetic tooth back portion to the back iron, wherein the non-magnetic tooth back portion includes at least one embedded conductor.

3. A method according to claim 2 wherein said step of attaching a plurality of non-magnetic teeth further comprises the step of attaching a substantially circular back portion unitary with the plurality of non-magnetic teeth to the back iron.

4. A method according to claim 3 wherein said step of attaching a plurality of non-magnetic teeth further comprises the step of attaching a substantially circular back portion unitary with the plurality of non-magnetic teeth to the back iron with a key.

5. A method according to claim 2 wherein said step of attaching a plurality of non-magnetic teeth further comprises the step of attaching a plurality of non-magnetic teeth comprising at least one of a carbon fiber and a fiber polymer to the iron.

6. A stator comprising:
   a back iron; and
   a plurality of non-magnetic teeth unitary with a back portion, said back portion mounted on said back iron, wherein at least one said non-magnetic tooth comprises at least one embedded conductor.

7. A stator according to claim 6 wherein said back portion is substantially circular.

8. A stator according to claim 7 further comprising at least one key extending from said back portion.

9. A stator according to claim 6 wherein said back portion is mounted on said back iron with a key.

10. A stator according to claim 6 wherein said non-magnetic teeth comprise at least one of a glass laminate, a carbon fiber, and a fiber polymer.

11. A dynamoelectric machine comprising:

a housing;

a stator comprising a bore therethrough mounted in said housing, said stator comprising a back iron and a plurality of non-magnetic teeth unitary each other and with a back portion, said back portion mounted to said back iron, wherein at least one of said non-magnetic teeth comprises at least one embedded conductor;

a plurality of armature windings mounted on said teeth; and a rotor rotatably mounted in said bore, said rotor comprising a plurality of field windings.

12. A machine according to claim 11 wherein said back section is substantially circular.

13. A machine according to claim 11 wherein said field windings are superconducting field windings.

14. A machine according to claim 13 further comprising:

a rotor jacket surrounding said field windings; and a vacuum pump in flow communication with an interior of said rotor jacket.

15. A machine according to claim 14 further comprising a cryogenic cooler coupled to said rotor shaft.

16. A machine according to claim 11 wherein said field windings configured for synchronous operation with said armature windings.

17. A machine according to claim 11 wherein said back portion keyed to said back iron.

18. A machine according to claim 17 wherein said back portion adhesively bonded to said back iron.

19. A machine according to claim 11 wherein said non-magnetic teeth comprise at least one of a glass laminate, a fiber polymer, and a carbon fiber.

20. A stator comprising:

a back iron; and a plurality of non-magnetic teeth unitary with a back portion, wherein at least one non-magnetic tooth includes at least one embedded conductor, said back portion mounted on said back iron.

* * * * *

UNITED STATES PATENT AND TRADEMARK OFFICE
CERTIFICATE OF CORRECTION

PATENT NO. : 6,768,244 B2
DATED : July 27, 2004
INVENTOR(S) : Ong et al.

It is certified that error appears in the above-identified patent and that said Letters Patent is hereby corrected as shown below:

Column 6,
Line 52, after "to the" inset -- back --.
Line 55, after "unitary with" insert -- each other and with --.

Column 7,
Line 5, after "unitary" insert -- with --.

Column 8,
Line 4, between "windings" and "configured" insert -- are --.

Signed and Sealed this

Thirtieth Day of August, 2005

JON W. DUDAS
*Director of the United States Patent and Trademark Office*